(12) United States Patent
Raffelstetter

(10) Patent No.: US 10,141,609 B2
(45) Date of Patent: Nov. 27, 2018

(54) ELECTRODE COIL FOR A GALVANIC ELEMENT, AND METHOD FOR PRODUCING SAME

(71) Applicant: Robert Bosch GmbH, Stuttgart (DE)

(72) Inventor: Peter Raffelstetter, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/544,134

(22) PCT Filed: Jan. 11, 2016

(86) PCT No.: PCT/EP2016/050393
§ 371 (c)(1),
(2) Date: Jul. 17, 2017

(87) PCT Pub. No.: WO2016/116317
PCT Pub. Date: Jul. 28, 2016

(65) Prior Publication Data
US 2017/0358828 A1 Dec. 14, 2017

(30) Foreign Application Priority Data
Jan. 19, 2015 (DE) .................. 10 2015 200 685

(51) Int. Cl.
*H01M 10/0587* (2010.01)
*H01M 10/04* (2006.01)
*H01M 10/42* (2006.01)

(52) U.S. Cl.
CPC ... *H01M 10/0587* (2013.01); *H01M 10/0431* (2013.01); *H01M 10/42* (2013.01)

(58) Field of Classification Search
CPC .................. H01M 10/0587; H01M 10/0431
See application file for complete search history.

(56) References Cited

U.S. PATENT DOCUMENTS 8,679,677 B1 * 3/2014 Tamaki ............... H01M 4/667
429/209
2002/0061440 A1 * 5/2002 Suzuki ............... H01M 4/131
429/217

(Continued)

FOREIGN PATENT DOCUMENTS

DE 3638793 5/1988
DE 102011120512 6/2013

(Continued)

OTHER PUBLICATIONS

International Search Report for Application No. PCT/EP2016/050393 dated May 18, 2016 (English Translation, 3 pages).

*Primary Examiner* — Miriam Stagg
*Assistant Examiner* — Brent C Thomas
(74) *Attorney, Agent, or Firm* — Michael Best & Friedrich LLP

(57) ABSTRACT

The invention relates to an electrode coil for a galvanic element, comprising a first electrode (4), a second electrode (6), a separator, and a reference electrode (8). The first electrode (4) and the second electrode (6) are insulated from each other by the separator, and the reference electrode (8) is arranged between the first electrode (4) and the second electrode (6) and is adhered to the first electrode (4) or to the second electrode (6). The invention further relates to a galvanic element comprising such an electrode coil and to a method for producing such an electrode coil.

14 Claims, 3 Drawing Sheets

(56) References Cited

U.S. PATENT DOCUMENTS

| | | | |
|---|---|---|---|
| 2004/0185332 A1* | 9/2004 | Botos | H01M 2/26 429/96 |
| 2006/0216600 A1 | 9/2006 | Inagaki et al. | |
| 2007/0166617 A1 | 7/2007 | Gozdz et al. | |
| 2008/0241687 A1 | 10/2008 | Ishii et al. | |
| 2009/0081551 A1 | 3/2009 | Hoshina et al. | |
| 2010/0196758 A1* | 8/2010 | Hojo | H01M 4/60 429/207 |
| 2013/0314051 A1 | 11/2013 | Takezawa | |

FOREIGN PATENT DOCUMENTS

| | | |
|---|---|---|
| JP | 2011034952 A | 2/2011 |
| WO | 2009036444 | 3/2009 |
| WO | 2012049201 | 4/2012 |
| WO | 2013006415 | 1/2013 |
| WO | 2015049778 A1 | 4/2015 |

* cited by examiner

ELECTRODE COIL FOR A GALVANIC ELEMENT, AND METHOD FOR PRODUCING SAME

BACKGROUND OF THE INVENTION

The invention relates to an electrode coil for a galvanic element, the electrode coil comprising a first electrode, a second electrode, a separator and a reference electrode.

A galvanic element having such an electrode coil and a method for producing such an electrode coil are furthermore provided.

WO 2012/049201 A1 discloses a lithium ion cell having a reference electrode, the reference electrode being arranged between an anode and a cathode, for example between two separator films or level with the anode or cathode, and is spatially separated and electrically insulated therefrom. The reference electrode is formed by metal sheets or expanded metal sheets having a coating or a lamination.

WO 2009/036444 A2 discloses a lithium ion battery for use in HEV, PHEV or EV vehicles, wherein the lithium ion battery comprises a reference electrode for monitoring the negative electrode potential. The active material of the reference electrode may be applied onto a metal current collector, either directly or mixed with a binder and a conductive additive. The reference electrode may be surrounded by a porous insulating coating. The reference electrode is in this case assigned to the housing wall.

DE 10 2011 120 512 A1 discloses a so-called pouch cell, having a reference electrode which is arranged above an anode and a cathode.

WO 2013/006415 A2 discloses a wound battery cell for electronic devices such as cell phones, laptop computers or the like, wherein a reference electrode having a nickel core and a lithium strip around the nickel core and having an enclosing separator layer is used. The reference electrode may in this case be arranged either in the periphery of the wound battery cell or in the middle of the wound battery cell.

SUMMARY OF THE INVENTION

According to a first aspect, an electrode coil for a galvanic element is provided, the electrode coil comprising a first electrode, a second electrode, a separator and a reference electrode. The first electrode and the second electrode are insulated from one another by the separator. The reference electrode is in this case arranged between the first electrode and the second electrode. The reference electrode is adhesively bonded onto the first electrode or onto the second electrode.

Galvanic elements typically comprise two electrodes, and therefore two poles. In the scope of the invention, the first electrode may for example be a cathodic electrode, or a cathode for short. The cathode in this case refers to the electrode which receives electrons when connected to a load, i.e. for example during the operation of an electrical vehicle. In this context, the cathode is also referred to as a positive electrode. The cathode typically consists of a current collector which is coated with on one or both sides with cathodically active material, which in the context of the present disclosure will be referred to as a first layer having a first active material. The current collector may, for example, consist of aluminum or nickel.

The active material of the cathode preferably contains a material that can reversibly absorb (intercalation) and subsequently release (deintercalation) lithium in ionic or metallic form. For example, the cathode contains metal oxides in pure or doped form, for example lithium cobalt oxide, lithium cobalt dioxide ($LiCoO_2$), lithium nickel cobalt mixed oxides, lithium manganese oxides (LMO), lithium manganese oxide spinel ($LiMn_2O_4$), lithium nickel manganese cobalt mixed oxides, lithium nickel manganese cobalt aluminum mixed oxides, lithium nickel cobalt aluminum oxides (NCA) or lithium metal phosphates, for example lithium iron phosphate ($LiFePO_4$) or sulfur, as well as sulfur compounds. The cathode optionally contains further layers, for example protective layers, which comprise for example lithium polyanionic compounds, for example $LiFePO_4$, or high-temperature stable porous ceramic protective layers, for example $Al_2O_3$.

The second electrode may be an anode, or in other words an anodic electrode. The anode refers to the electrode which releases electrons when connected to a load, i.e. for example during the operation of an electrical vehicle. The anode is in this case also referred to as a negative electrode. The anode may in principle be formed from any material known for the production of lithium ion anodes. The anode typically consists of a current collector, for example made of copper, which may be coated on one or both sides with anodically active material, which in the context of the present disclosure will be referred to as a second layer having a second active material. Anodically active material may comprise lithium, magnesium, iron, nickel, aluminum, zinc or compositions thereof, or any material which can release electrons and generate an ion flow. For instance, silicon, germanium, lithium, a carbon-containing material, for example graphite, or amorphous carbons or a metal alloy, may be advantageous as anodically active material. Hybrid electrodes having lithium alloy components are also common. The anode optionally contains protective layers, for example high-temperature stable porous ceramic protective layers, for example $Al_2O_3$.

According to one embodiment, the reference electrode comprises a reference current collector which is configured as a metal sheet or as a metal grid. A grid offers the advantage that a smaller total thickness of the reference electrode can be maintained. Another advantage is that a flow of ions can also take place through the grid, so that the power density of the galvanic element is increased. Since no current flows to the reference electrode or flows away therefrom, even a small active cross section of the electrode allows sufficient measurement sensitivity.

The reference current collector may be made of any material used for electrode current collectors. Preferred materials are aluminum, copper or nickel, this depending on the type of the active material used for the reference electrode.

According to one embodiment, the reference electrode comprises a third layer having a third active material, which comprises $LiFePO_4$ and/or $Li_4Ti_5O_{12}$. These materials offer a wide potential plateau in a typical charging/discharging curve of the galvanic element. $LiFePO_4$ exhibits, for example, a potential plateau at about 3.4 V. $Li_4Ti_5O_{12}$ exhibits a potential plateau at about 1.6 V. The third layer having the third active material is, for example, arranged as a viscous slurry on both sides of a reference current collector and hardened, suitable conductivity additives and binders being added to the slurry. After hardening, the slurry is dry.

According to one embodiment, the reference electrode is separated by an insulating layer from that electrode onto which it is adhesively bonded. The insulating layer is used to electrically insulate the reference electrode from that electrode to which it is adhesively bonded. The insulating layer is preferably a porous layer, which may for example be made of a ceramic material, in particular $Al_2O_3$. One advantage of ceramic materials is that they are substantially heat resistant. As an alternative or in addition thereto, a chemically inert polymer may be used as the insulating layer, in particular polyolefins such as polypropylene (PP) or polyethylene (PE). One advantage of the polymer layer is that it can be made very thin. Separators (separation of the anode and the cathode), for example made of PP, can be produced with a thickness of as little as about 12 μm. This dimensional indication is also relevant for the insulating layer. For the case in which the galvanic element is not wound in the known manner of a jelly roll, but comprises a coating process directly on the electrode, even smaller thicknesses are possible. The preferred dimensions are dictated by practical applicability, particularly in relation to mechanical robustness which they must show under realistic field stresses.

Furthermore, the porous ceramic protective layers may also be made very thin; for example, ceramic $Al_2O_3$ protective layers on the anode or the cathode may be applied with a thickness of as little is 5 μm by slurry coating.

Preferably, the reference electrode is adhesively bonded to the first or to the second electrode by a chemically inert adhesive, wherein the adhesive comprises polysiloxane and/or acrylic. In this case, wide-area adhesive application is not necessary, and the fastening may be carried out by adhesive spots which respectively may constitute, for example, no more than 10% of the active area of the reference electrode. A typical size of the reference electrode is, for example, 1 mm in width and a few centimeters in length.

The reference current collector is insulated by about 1-2 cm starting from an edge with the active material, in order to avoid a short circuit with the current collector of the first or second electrode.

According to another aspect, a galvanic element, which comprises at least one such electrode coil, is provided. In a battery, a plurality of such galvanic elements or galvanic cells may preferably be spatially combined and connected to one another by circuit technology. For example, a plurality of galvanic elements, connected in series or parallel to form modules, may be used in order to be able to provide required power data. In the present description, the term "battery" is also used for accumulator, as is customary in general language usage.

According to another aspect, a method for producing an electrode coil for a galvanic element is described, in particular one of the electrode coils described above. Accordingly, features described in the context of the method apply correspondingly for the system, and, conversely, the features described in the context of the system apply correspondingly for the method.

The method in this case comprises the following steps:
a) providing a first electrode, a second electrode, a separator and a reference electrode,
b) producing a coil arrangement, the first electrode and the second electrode being insulated from one another by the separator, and the reference electrode being arranged between the first electrode and the second electrode, and
c) winding the coil arrangement about a coil axis in order to produce the electrode coil.

Provision is made in this case that the reference electrode is adhesively bonded onto the first electrode or onto the second electrode in step b).

The production of the coil arrangement in step b) may, for example, be carried out in a continuous process in which material webs are combined by means of a calender and wound. As an alternative, provision may be made to place a plurality of cut metal webs on one another, these then being wound. The winding may be carried out with the aid of a mandrel, which is arranged in the coil axis and about which the coil arrangement is wound, the mandrel being, for example, removed after the winding so as not to impair the energy density of the electrode coil. As an alternative thereto, the coil arrangement may be rolled up without a mandrel.

In a further method step, after the winding, provision may be made to press the electrode coil flat, so that, for example, it may be received in a prismatic, in particular cuboid, container.

According to a preferred embodiment, in step b) the first electrode and the second electrode are arranged offset with respect to one another in relation to the coil axis, so that a first current collector of the first electrode and a second current collector of the second electrode protrude oppositely to one another in relation to the coil axis beyond the body which comprises a first layer having a first active material of the first electrode and a second layer having a second active material of the second electrode as well as the separator. A reference current collector of the reference electrode in this case likewise protrudes beyond the body in the direction of the coil axis. This thus leads to an arrangement in which the current collectors respectively protrude on the end side in relation to the coil axis, the reference current collector furthermore protruding on one side as well. The body forms the chemically active part of the electrode coil.

According to a preferred embodiment, the current collector of that electrode onto which the reference electrode is adhesively bonded is provided with recesses. The reference current collector is arranged in the recesses in step b) of the method. A distance from 1 to 2 cm is particularly preferably provided between the reference current collector and the current collector of that electrode onto which the reference electrode is adhesively bonded, so that the risk of a short circuit is avoided. In an alternative embodiment, it is possible for the current collector of that electrode onto which the reference electrode is not adhesively bonded to be provided with recesses, the reference current collector likewise being arranged in the corresponding recesses in step b) in order to obtain electrical insulation.

The reference electrode between the anode and cathode makes it possible to measure the individual electrode potentials. Without a reference electrode, only information about the difference between the electrode potentials can be measured. More accurate information about the individual electrode potentials may lead to improvement of the lifetime and the reliability of the battery.

The proposed method of production by adhesively bonding the reference electrode onto an electrode is economical and allows mass production. Integration into current methods of production of electrode coils (also referred to as jelly rolls) is possible.

BRIEF DESCRIPTION OF THE DRAWINGS

Exemplary embodiments of the invention are represented in the drawings and will be explained in more detail in the description below.

In the drawings

DETAILED DESCRIPTION

In the following description of exemplary embodiments of the invention, components and elements which are the same or similar are provided with references which are the same or similar, repeated description of these components or elements being omitted in particular cases. The figures only schematically represent the subject matter of the invention.

Embodiments of the Invention

Figure 1:
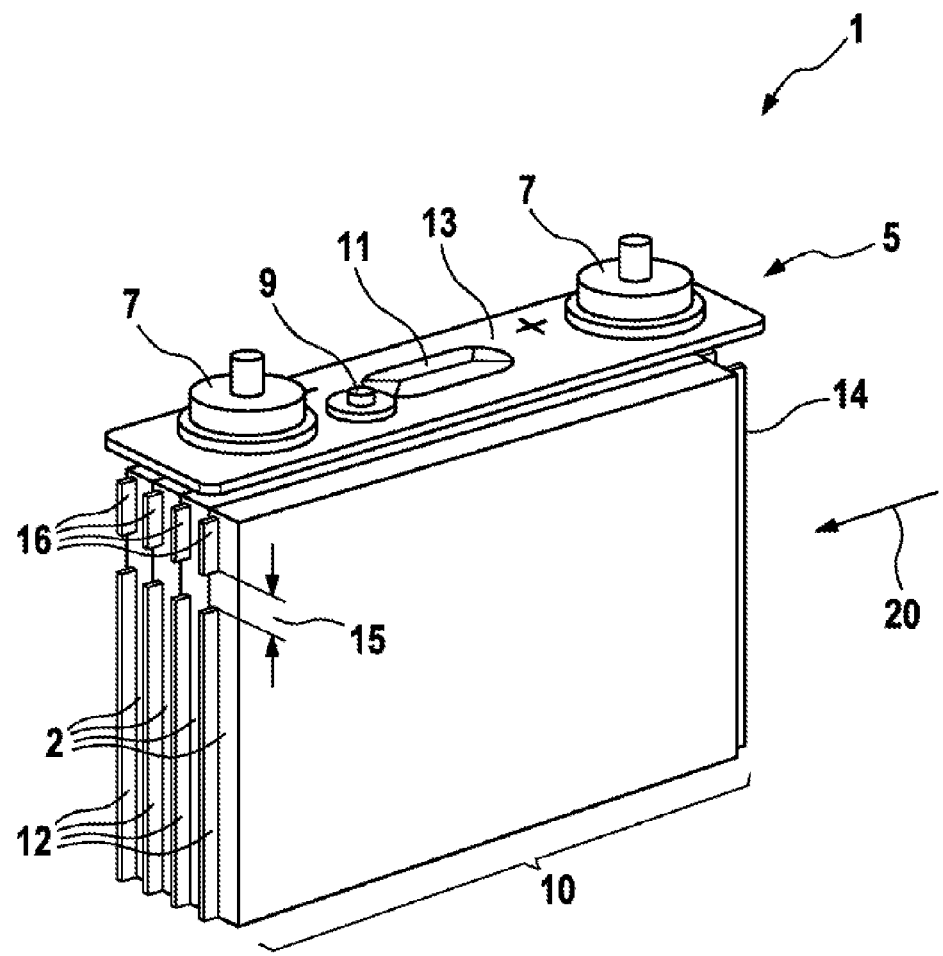
FIG. 1 shows a galvanic element in perspective representation without a housing.

FIG. 1 shows a galvanic element 1 in perspective view, for clarity without a housing. The galvanic element 1 may also be referred to as a battery cell.

The galvanic element 1 comprises four electrode coils 2 arranged closely next to one another and a cover group 5, the cover group 5 comprising two terminals 7, by means of which the galvanic element 1 is electrically contacted from the outside.

The cover group 5 is furthermore assigned a filling opening 9 and a rupture membrane 11. The filling opening 9 and the rupture membrane 11 lie essentially at the center of a closure plate 13, while the terminals 7 are positioned peripherally on the closure plate 13. For assembly, the four electrode coils 2 are placed in a cell housing (not represented) and the cell housing is filled with a liquid electrolyte through the filling opening 9, which is subsequently sealed.

The four electrode coils 2 were respectively produced by winding a coil arrangement 3, the coil arrangement 3 being described in more detail below with reference to FIGS. 2 to 4. A possible coil axis 20 is already represented in FIG. 1. In relation to the coil axis 20, first current collectors 12 are arranged on the opposite side from second current collectors 14. The first current collectors 12 and the second current collectors 14 in this case protrude beyond bodies 10 which form the chemically active part of the electrode coils 2. Reference current collectors 16 are furthermore arranged on the side of the first current collectors 12. The reference current collectors 16 are in this case arranged at a distance 15 from the first current collectors 12, and advantageously lie close to the terminals 7.

Figure 2:
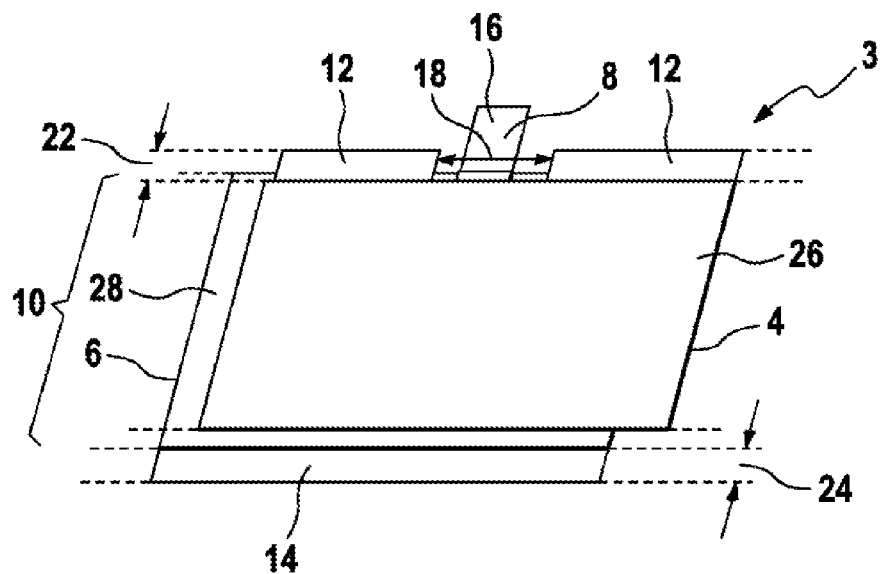
FIG. 2 shows a coil arrangement in perspective representation.

FIG. 2 shows a coil arrangement 3, which comprises a first electrode 4, a second electrode 6 and a reference electrode 8. For example, the first electrode 4 may be the cathode and the second electrode 6 may be the anode.

The first electrode 4 comprises a first layer 26 having first active material, i.e. having cathodically active material, and the first current collector 12, which in the embodiment represented is provided with a recess 18 in which the reference current collector 16 of the reference electrode 8 is arranged.

The second electrode 6 comprises a second layer 28 having a second active material, i.e. having an anodically active material, and the second current collector 14. The first electrode 4 and the second electrode 6 are arranged offset with respect to one another in relation to the coil axis 20 (not represented here). The first current collector 12 and the second current collector 14 are arranged so as to be opposite one another in relation to the coil axis 20 and protrude beyond the body 10, which comprises the first layer 26 having the first active material of the first electrode 4, the second layer 28 having the second active material of the second electrode 6, and a separator 30, as represented in FIG. 4. The first electrode 4 therefore has a first projection 22 relative to the body 10. The second electrode 6 has a second projection 24 relative to the body 10.

Figure 3:
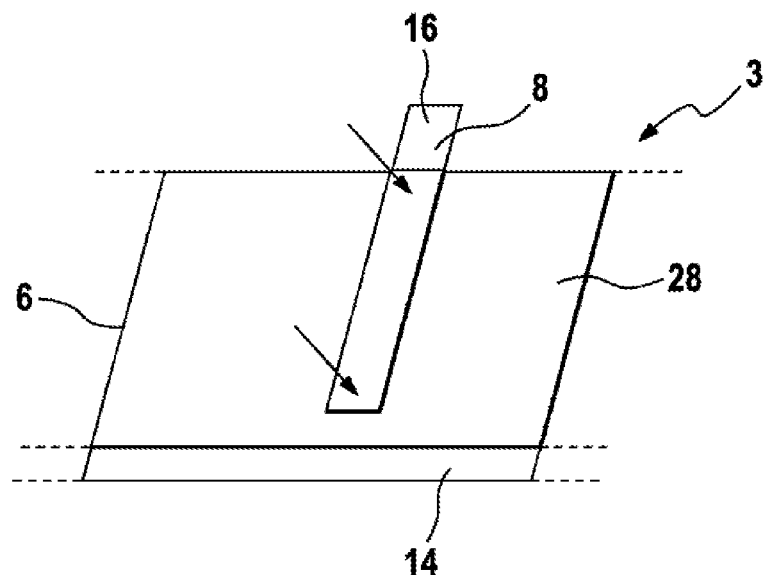
FIG. 3 shows a coil arrangement in sectional view.

FIG. 3 shows a section through the coil arrangement 3, represented in FIG. 2, in the plane of the drawing, so that the first electrode 4 is not represented. The reference electrode 8 is adhesively bonded onto the second electrode 6 at the positions marked by arrows. As an alternative, surface-wide adhesive bonding may be carried out. Adhesive bonding at precisely two positions spaced as far apart from one another as possible is preferred, as represented in FIG. 3, so that on the one hand little material is used and on the other hand there is directionally stable fastening. As an alternative, the reference electrode 8 may be adhesively bonded in a similar way onto the first electrode 4 (not represented).

Figure 4:
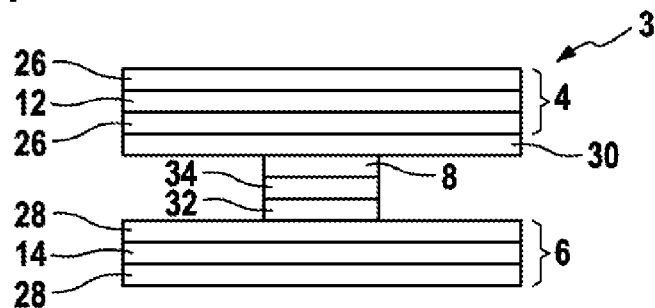
FIG. 4 shows a coil arrangement in plan view.

FIG. 4 shows a plan view of the coil arrangement 3 represented in FIG. 2, this being schematically represented as a layer system and not allowing any conclusions to be drawn about the actual thicknesses of the individual layers. Only the sequence of the layers is revealed by FIG. 4.

The coil arrangement 3 comprises the first electrode 4, which is formed from the first current collector 12 that is coated on both sides with the first layer 26 having the first active material. The first electrode 4 adjoins a separator 30, which in turn adjoins the reference electrode 8. The reference electrode 8 likewise comprises a layer system having the first current collector 12 at, on both sides, a third layer 36 having third active material, which is represented and described with reference to FIGS. 5 and 6a, 6b. The reference electrode 8 is covered, on its side facing away from the separator 30 and the first electrode 4, with an insulating layer 30 which electrically insulates the reference electrode 8 from the second electrode 6 at those positions where no adhesive 32 is present. FIG. 4 represents the section at a position where the adhesive 32 is present. The second electrode 6 comprises the second current collector 14, which is enclosed on both sides by the second layer 28 having the second active material. The second electrode 6 is separated from the first electrode 4 by the separator 30. The separator 30 is in this case the known separator which is wound surface-wide between anode and cathode in every battery. The reference electrode 8 is separated from the first electrode 4 by the separator 30 and from the second electrode 6 by the insulating layer 34, which forms a second separator.

Figure 5:
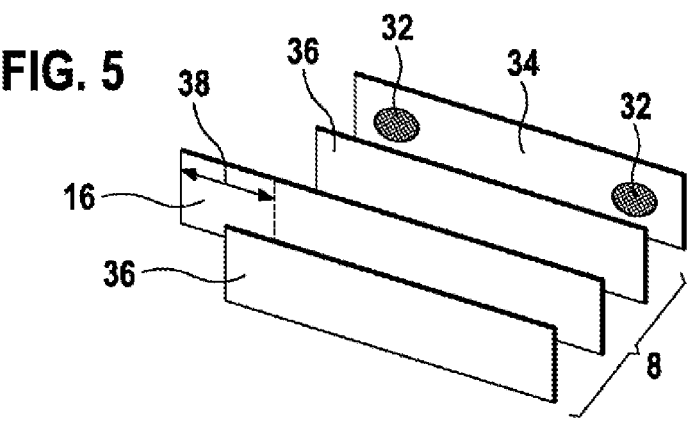
FIG. 5 shows an arrangement with a reference electrode in perspective representation.

FIG. 5 shows a perspective view of an arrangement having the reference electrode 8 and the insulating layer 34 with the adhesive 32. The reference electrode 8 comprises the reference current collector 16, which is coated on both sides with the third layer 36 having the third active material. The reference current collector 16 protrudes beyond the third layer 36 having the third active material by a third projection 38. The preferred two adhesive surfaces with the adhesive 32 for fastening the reference electrode 8 on the first electrode 4 or the second electrode 6 are again represented.

Figure 6A:
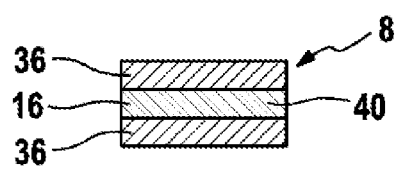
FIGS. 6a and 6b show sections through reference electrodes according to different embodiments.
Figure 6B:
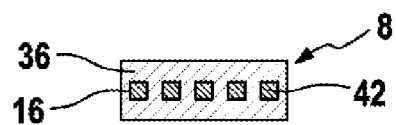

FIG. 6a shows a cross section through the reference electrode 8 according to a first embodiment, the reference current collector 16 being formed by a metal sheet 40. FIG. 6b shows a corresponding cross section through the reference electrode 8 according to another embodiment, in which the reference current collector 16 is formed by a metal grid 42.

The invention is not restricted to the exemplary embodiments described here and the aspects highlighted therein.

Rather, many variants which lie within the capability of the person skilled in the art are possible within the scope specified by the claims.

What is claimed is:

1. An electrode coil (2) for a galvanic element (1), the electrode coil comprising a first electrode (4), a second electrode (6), a separator (30) and a reference electrode (8), the first electrode (4) and the second electrode (6) being insulated from one another by the separator (30), and the reference electrode (8) being arranged between the first electrode (4) and the second electrode (6), characterized in that the reference electrode (8) includes a reference current collector (16), wherein the reference electrode (8) is adhesively bonded onto the second electrode (6) such that the reference current collector (16) projects past an edge of the second electrode (6), wherein the first electrode (4) includes a first current collector (12), wherein the first current collector (12) includes two regions that are separated by an open gap (18), and wherein the reference current collector (16) is disposed within the open gap (18).

2. The electrode coil (2) as claimed in claim 1, characterized in that the reference electrode (8) comprises a third layer (36) having a third active material, which comprises $LiFePO_4$ and/or $Li_4Ti_5O_{12}$.

3. The electrode coil (2) as claimed in claim 1, characterized in that the reference electrode (8) is separated by an insulating layer (34) from the one of the first and second electrodes (4, 6) onto which the reference electrode is adhesively bonded.

4. The electrode coil (2) as claimed in claim 3, characterized in that the insulating layer (34) comprises a ceramic material and/or a chemically inert polymer.

5. The electrode coil (2) as claimed in claim 1, characterized in that the reference electrode (8) is adhesively bonded to the first (4) or to the second (6) electrode by a chemically inert adhesive (32), which comprises polysiloxane and/or acrylic.

6. A galvanic element (1), which comprises at least one electrode coil (2) as claimed in claim 1.

7. A method for producing the electrode coil (2) of claim 1, comprising the steps:
   a) providing the first electrode (4), the second electrode (6), the separator (30) and the reference electrode (8),
   b) producing a coil arrangement (3), the first electrode (4) and the second electrode (6) being insulated from one another by the separator (30), the reference electrode (8) being arranged between the first electrode (4) and the second electrode (6), and the reference electrode (8) being adhesively bonded onto the second electrode (6), and
   c) winding the coil arrangement (3) about a coil axis (20) in order to produce the electrode coil (2) of claim 1.

8. The method as claimed in claim 7, characterized in that in step b) the first electrode (4) and the second electrode (6) are arranged offset with respect to one another in relation to the coil axis (20), so that the first current collector (12) of the first electrode (4) and the second current collector (14) of the second electrode (6) protrude oppositely to one another in relation to the coil axis (20) beyond a body (10) which comprises a first layer (26) having a first active material of the first electrode (4) and a second layer (28) having a second active material of the second electrode (6) as well as the separator (30), the reference current collector (16) of the reference electrode (8) protruding beyond the body (10) in the direction of the coil axis (20).

9. The electrode coil (2) as claimed in claim 3, characterized in that the insulating layer (34) comprises $Al_2O_3$, and/or a chemically inert polymer.

10. The electrode coil (2) as claimed in claim 3, characterized in that the insulating layer (34) comprises $Al_2O_3$, and/or a polyolefin.

11. The electrode coil (2) as claimed in claim 3, characterized in that the insulating layer (34) comprises $Al_2O_3$, and/or polypropylene or polyethylene.

12. The electrode coil (2) as claimed in claim 1, wherein the reference current collector (16) is coated on opposite sides with an active material (36).

13. The electrode coil (2) as claimed in claim 1, wherein the first electrode (4) includes layers of cathodically active material (26) disposed on opposite sides of the first current collector (12), and wherein the second electrode (6) includes layers of anodically active material (28) disposed on opposite sides of the second current collector (14).

14. The electrode coil as claimed in claim 1, wherein the current collector (16) includes a metal grid (42).

* * * * *